O. SPENCER.
FOOT ACCELERATOR FOR AUTOMOBILES.
APPLICATION FILED AUG. 5, 1913.
1,081,166.
Patented Dec. 9, 1913.
2 SHEETS—SHEET 1.
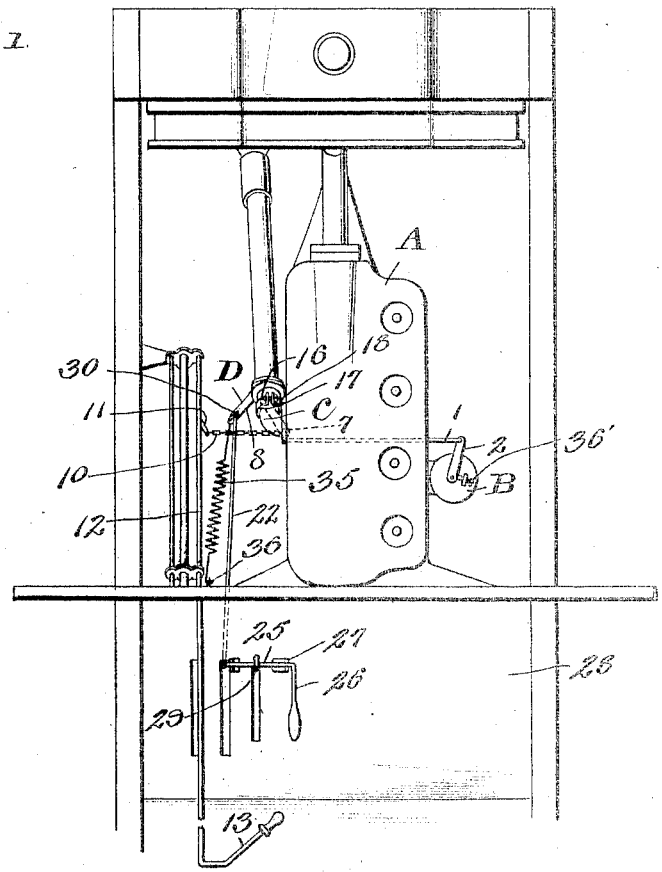
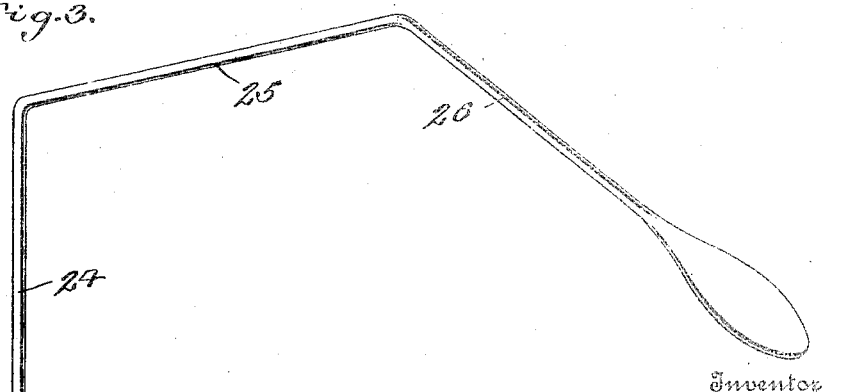

O. SPENCER.
FOOT ACCELERATOR FOR AUTOMOBILES.
APPLICATION FILED AUG. 5, 1913.
1,081,166.
Patented Dec. 9, 1913.
2 SHEETS—SHEET 2.
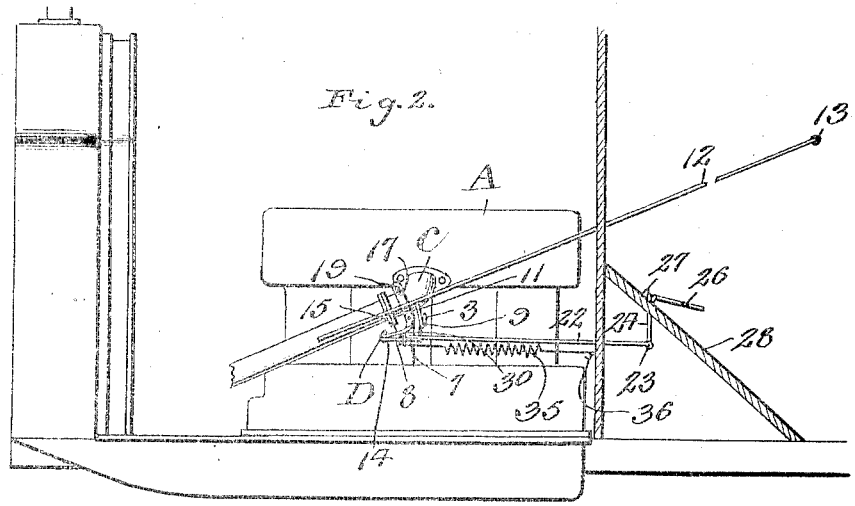
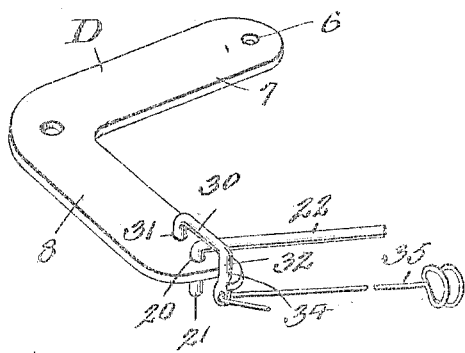
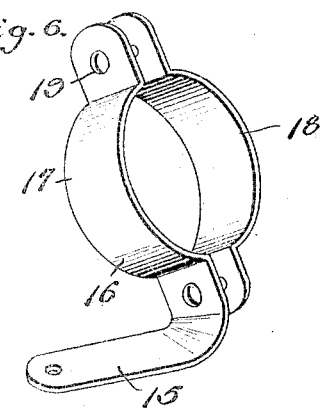
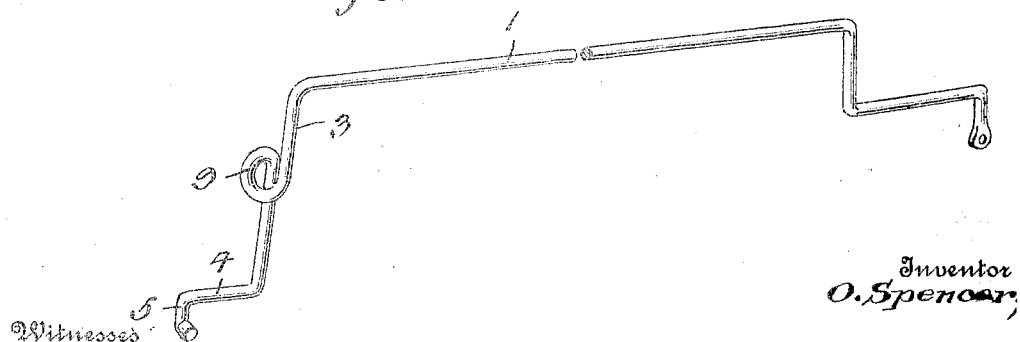
Witnesses
Inventor
O. Spencer,
By Victor J. Evans
Attorney

UNITED STATES PATENT OFFICE.

ORA SPENCER, OF CUERO, TEXAS.

FOOT-ACCELERATOR FOR AUTOMOBILES.

1,081,166.  Specification of Letters Patent.  Patented Dec. 9, 1913.

Application filed August 5, 1913. Serial No. 782,145.

*To all whom it may concern:*

Be it known that I, ORA SPENCER, a citizen of the United States, residing at Cuero, in the county of Dewitt and State of Texas, have invented new and useful Improvements in Foot-Accelerators for Automobiles, of which the following is a specification.

This invention relates to foot accelerators for automobiles and similar vehicles driven by internal combustion engines, the object in view being to provide simple, reliable and flexible means whereby the operator has a perfect foot control over the throttle valve which enables him to readily speed up and throttle down the engine without using either hand, both hands being thus left free to manipulate the other controls of the machine.

A further object of the invention is to provide means of the character above referred to in which the several elements are readily accessible and adapted to be easily disassociated and disconnected to facilitate the removal of the engine or the detaching of the floor boards in order to give access to the transmission gear and other parts of the machine.

A further object of the invention is to so combine the elements of the foot accelerating means as to avoid all rattle and noise and at the same time prevent undue wear on the butter-fly or throttle valve and the stem and adjusting screw thereof.

With the above and other objects in view, the invention consists in the construction, combination and arrangement of parts, as will hereinafter be more fully described, illustrated and claimed.

In the accompanying drawings: Figure 1 is a plan view partly broken away, of a sufficient portion of an automobile to illustrate the application of the present invention thereto. Fig. 2 is a vertical longitudinal section through the same. Fig. 3 is a detail perspective view of the pedal shaft. Fig. 4 is a similar view of the bell crank and the parts intimately associated therewith. Fig. 5 is a detail perspective view of the cross rod. Fig. 6 is a detail perspective view of the bracket and clamping means therefor.

The invention to be herein described is designed especially for use on the present day Ford automobile known as the model "T" and therefore in the accompanying drawings I have shown the usual four-cylinder four-cycle internal combustion motor designated generally by the reference character A, said engine having the carbureter B arranged at one side thereof and the usual water connection C arranged at the opposite side thereof.

1 designates a cross-rod which is connected at one end to the throttle lever or arm 2 of the carbureter, said cross-rod extending between the cylinders of the engine and across to the opposite side thereof where it is provided with a downwardly extending spring arm 3 having at its lower extremity a horizontal offset 4 terminating in a downwardly projecting finger 5 which is inserted in a hole 6 in one arm 7 of a bell crank lever designated at D, 8 representing the other arm of said bell crank lever.

Intermediate its ends the arm 3 is formed with a coil 9 to which is attached one end of a flexible connection 10 such as a chain the opposite end thereof being attached to the arm 11 of a hand throttle shaft 12 which extends in parallel relation to the steering column and is provided at its upper end with a hand throttle lever 13, the parts 11, 12 and 13 being the same as those now in common use.

The bell crank lever D is fulcrumed at 14 on the arm 15 of a bracket 16. This bracket comprises clamping means consisting of two oppositely arranged substantially semi-circular jaws 17 and 18 which are adjustably connected together by means of bolts 19, said clamping means being adapted to embrace the water connection C above referred to so as to support said bracket in fixed relation to said water connection and the engine. At the same time the construction referred to enables the bracket and parts associated therewith to be readily attached to and detached from the machine.

The arm 8 of the lever D is formed with a hole 20 to receive the downwardly extending finger 21 at the forward extremity of a push rod 22 the rear end of which is pivotally attached at 23 to the downwardly extending arm 24 of a pedal shaft 25, said shaft being provided with a pedal 26 arranged within convenient reach of the operator's foot. The shaft 25 is conveniently mounted and journaled in a pair of brackets 27 arranged in spaced relation to each other and conveniently fastened to the foot board 28 of the machine. 29 designating a fixed eye which serves to retain the shaft 25 in place while permitting the same to turn easily.

In order to provide for readily disconnecting the push rod 22 from the bell crank lever D, the usual cotter pin is dispensed with and in lieu thereof a pivoted keeper 30 is employed, said keeper being pivotally connected to the arm 8 of the lever at the point 31 so as to swing in relation to said lever. The keeper 30 extends over the top of the push rod 22 to prevent the finger 21 from becoming displaced from the hole 20 and the end of the keeper is bent into the form of a hook 32 which is movable in a slot 34 at the end of the arm 8 of the lever D, the hook being held at the inner end of the slot 34 by means of a coiled contractile spring 35 one extremity of which is attached to the hook 32 while the other end is secured at the point 36 to the frame of the machine. The tension of the spring 35 serves to maintain the keeper 30 in the position illustrated in the drawings, the keeper maintaining the pivotal connection between the push rod 22 and the bell crank lever D. In order to disconnect the rod 22 from the lever D the keeper 30 is pushed forward beyond the hole 20 whereupon the finger 21 may be lifted out of place thus throwing the accelerator out of use and enabling the boards of the floor 28 to be taken out.

From the foregoing description it will be seen that the throttle valve may be operated either by hand or foot the foot accelerator being capable of use either independently of or simultaneously with the hand throttle lever. This enables the operator to accelerate the machine by his foot alone, leaving both hands free to manipulate the other controls of the machine. The spring 35 serves to maintain the parts of the mechanism referred to in their proper relation to each other, while the spring cross-rod 1 absorbs the jar and vibration and thereby prevents undue wear on the butter-fly valve, and the limiting set screw 36 with which all carbureters are provided for the purpose of preventing the complete closing of the throttle valve. The spring 35 and the crosshead 1 together with the spring arm 3 thereof serve in conjunction with each other to maintain all parts of the mechanism referred to under a tension which will avoid any tendency to rattle and wear.

What I claim is:—

1. A foot accelerator for automobiles comprising in combination with an internal combustion engine and carbureter, a bell crank lever, a supporting bracket for said lever located on the opposite side of the engine from the carbureter, clamping means on said bracket for fastening the latter to the water connection of said engine, a cross rod connecting said lever with the throttle valve of the carbureter, a pedal shaft, an arm on said shaft, a push rod connecting said arm and bell crank lever, and a spring acting on said lever to hold the throttle normally closed.

2. A foot accelerator for automobiles comprising in combination with an internal combustion engine and carbureter, a bell crank lever, a supporting bracket for said lever located on the opposite side of the engine from the carbureter, clamping means on said bracket for fastening the latter to the water connection of said engine, a cross rod connecting said lever with the throttle valve of the carbureter, a pedal shaft, an arm on said shaft, a push rod connecting said arm and bell crank lever, a spring acting on said lever to hold the throttle normally closed, said bell crank lever being formed with a slot, and a keeper for said push rod pivotally connected to and carried by said bell crank lever and having a hooked extremity movable in said slot and having said spring attached thereto.

3. A foot accelerator for automobiles comprising in combination with an internal combustion engine and carbureter, a bell crank lever, a supporting bracket for said lever located on the opposite side of the engine from the carbureter, clamping means on said bracket for fastening the latter to the water connection of said engine, a cross rod connecting said lever with the throttle valve of the carbureter, said rod having an end portion thereof bent to form a spring arm which is terminally connected to said bell crank lever, a pedal shaft, an arm on said shaft, a push rod connecting said arm and bell crank lever, and a spring acting on said lever to hold the throttle closed.

4. A foot accelerator for automobiles comprising in combination with an internal combustion engine and carbureter, a bell crank lever, a supporting bracket for said lever located on the opposite side of the engine from the carbureter, clamping means on said bracket for fastening the latter to the water connection of said engine, a cross rod connecting said lever with the throttle valve of the carbureter, a pedal shaft, an arm on said shaft, a push rod connecting said arm and bell crank lever, a spring acting on said lever to hold the throttle normally closed, and a flexible connection operated by said bell crank lever and operatively connected with said hand throttle lever.

In testimony whereof I affix my signature in presence of two witnesses.

ORA SPENCER.

Witnesses:
PAUL H. BREEDEN,
FRITZ A. SCHORRE, Jr.